(12) United States Patent
Fukui et al.

(10) Patent No.: US 9,876,936 B2
(45) Date of Patent: Jan. 23, 2018

(54) IMPOSITION DEVICE, PRINTING SYSTEM, RECORDING MEDIUM, AND IMPOSITION METHOD

(71) Applicant: FUJI XEROX CO., LTD., Tokyo (JP)

(72) Inventors: Takeshi Fukui, Kanagawa (JP); Shingo Tajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/344,296

(22) Filed: Nov. 4, 2016

(65) Prior Publication Data

US 2017/0339306 A1   Nov. 23, 2017

(30) Foreign Application Priority Data

May 20, 2016   (JP) ................................ 2016-101085

(51) Int. Cl.
   *G06K 15/00*   (2006.01)
   *H04N 1/387*   (2006.01)
   *G06F 3/12*   (2006.01)

(52) U.S. Cl.
   CPC ......... *H04N 1/3877* (2013.01); *G06F 3/1204* (2013.01); *G06F 3/125* (2013.01); *G06F 3/1208* (2013.01); *G06F 3/1241* (2013.01); *H04N 2201/0094* (2013.01)

(58) Field of Classification Search
   CPC .......... H04N 1/3877; H04N 2201/0094; G06F 3/1204; G06F 3/1208; G06F 3/1241; G06F 3/125

USPC ....................................................... 358/1.18
See application file for complete search history.

(56) References Cited

U.S. PATENT DOCUMENTS

| | | | |
|---|---|---|---|
| 8,305,594 B2* | 11/2012 | Tomita | G06F 3/1204 358/1.1 |
| 2003/0020956 A1* | 1/2003 | Goel | G06K 15/02 358/1.18 |
| 2004/0085578 A1* | 5/2004 | Quek | G06Q 30/02 358/1.18 |
| 2006/0126120 A1 | 6/2006 | Imafuku et al. | |
| 2010/0188679 A1* | 7/2010 | Nakagawa | H04N 1/0035 358/1.12 |

FOREIGN PATENT DOCUMENTS

| | | |
|---|---|---|
| JP | 2006-167917 A | 6/2006 |
| JP | 2009-105757 A | 5/2009 |

* cited by examiner

*Primary Examiner* — Neil R McLean
(74) *Attorney, Agent, or Firm* — Oliff PLC

(57) ABSTRACT

An imposition device includes an imposing unit that imposes images of plural document pages in a same page order as a pamphlet; a rotation selecting unit that selects whether or not to rotate, by 180 degrees, one of the images that corresponds to a back cover of a pamphlet obtained from a printed material on which the images have been imposed by the imposing unit; and a rotation processing unit that rotates the image that corresponds to the back cover by 180 degrees in a case where rotation of the image that corresponds to the back cover is selected by the rotation selecting unit.

6 Claims, 9 Drawing Sheets

FIG. 3A
FIG. 3B
FIG. 4

FIG. 5

DETAILED SETTINGS

BINDING DIRECTION

| LEFT BINDING | ▽ |

✓ LEFT BINDING
　 RIGHT BINDING

✓ SEPARATION INTO PARTS   NUMBER OF SHEETS OF PAPER IN EACH SEPARATE PART   [ 2 △▽ ]

POSITION AT WHICH BLANK PAGE IS INSERTED

| LAST PAGE | ▽ |

✓ LAST PAGE
　 SECOND LAST PAGE
　 SECOND PAGE
　 FIRST PAGE

✓ ROTATE BACK COVER BY 180 DEGREES ( OK )   ( CANCEL )

IMPOSITION DEVICE, PRINTING SYSTEM, RECORDING MEDIUM, AND IMPOSITION METHOD

CROSS-REFERENCE TO RELATED APPLICATIONS

This application is based on and claims priority under 35 USC 119 from Japanese Patent Application No. 2016-101085 filed May 20, 2016.

BACKGROUND (i) Technical Field

The present invention relates to an imposition device, a printing system, a recording medium, and an imposition method.

(ii) Related Art

Conventionally, a document page arranging method for books is employed in imposition for booklets. However, there is an exception. In the case of wall calendars, a top-to-bottom direction of a top cover is desirably the same as that of a back cover in a state where a printed material is closed. However, in a case where the document page arranging method for books is employed in imposition for wall calendars, a top-to-bottom direction of a top cover is different from that of a back cover in a state where a printed material is closed.

For this reason, conventionally, a user determines a page corresponding to a back cover and rotates this page by 180 degrees so that a top-to-bottom direction of a top cover is the same as that of the back cover. However, if a user determines a page to be rotated by 180 degrees, there is a risk of wrongly determining the page to be rotated, for example, in a case where separate parts are prepared or in a case where the number of pages is not a multiple of 4. Furthermore, since a user need perform this operation for each set of documents, the user is forced to bear heavy burden, for example, in a case where plural sets of documents need be printed.

SUMMARY

According to an aspect of the invention, there is provided an imposition device including an imposing unit that imposes images of plural document pages in the same page order as a pamphlet; a rotation selecting unit that selects whether or not to rotate, by 180 degrees, one of the images that corresponds to a back cover of a pamphlet obtained from a printed material on which the images have been imposed by the imposing unit; and a rotation processing unit that rotates the image that corresponds to the back cover by 180 degrees in a case where rotation of the image that corresponds to the back cover is selected by the rotation selecting unit.

BRIEF DESCRIPTION OF THE DRAWINGS

An exemplary embodiment of the present invention will be described in detail based on the following figures, wherein:

FIGS. 3A and 3B illustrate a printed material obtained after binding;

FIG. 4 illustrates a setting screen for setting a method for binding a booklet;

FIG. 5 illustrates a detailed setting screen for setting a method for binding a booklet;

DETAILED DESCRIPTION

An exemplary embodiment of the present invention is described below.

Note that all images handled in the exemplary embodiment described below are images in an electronic data form except for images printed on sheets of paper. Therefore, in the following description, even an image in an electronic data form is sometimes expressed simply as an "image" without explicitly indicating that the image is electronic data by using a term such as "image data". The same applies to other terms, such as "document", encompassed within the term "image".

Figure 1:
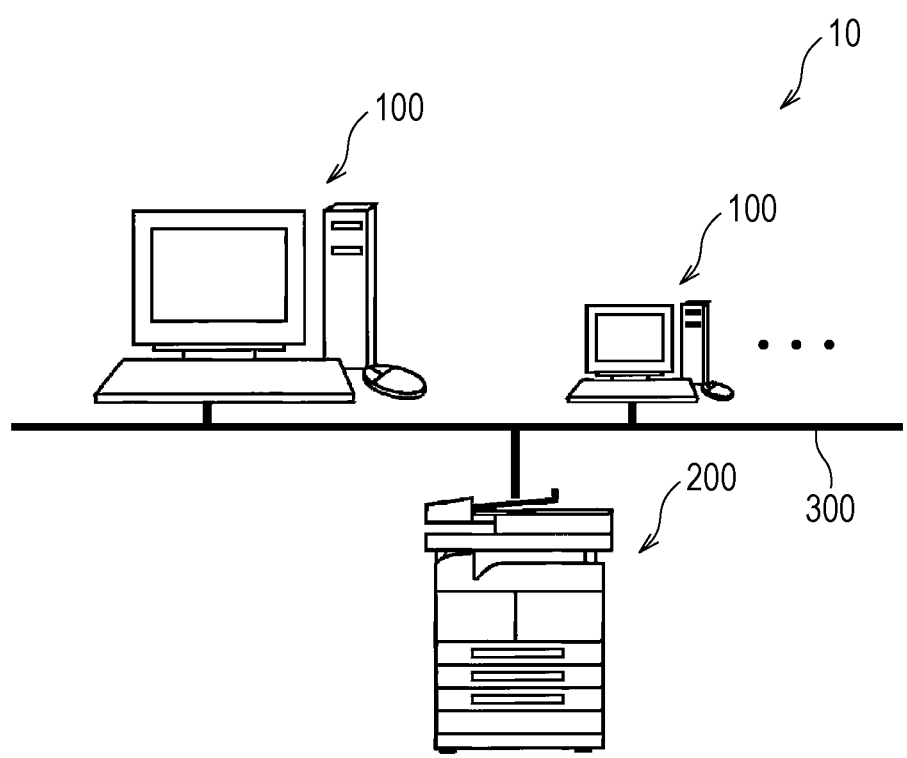
FIG. 1 is a conceptual diagram illustrating an overall configuration of a printing system.

FIG. 1 is a conceptual diagram illustrating an overall configuration of a printing system. The printing system illustrated in FIG. 1 corresponds to one exemplary embodiment of a printing system of the present invention.

The printing system 10 illustrated in FIG. 1 includes plural client personal computers (PCs) 100 and a multi-function printer 200 that are connected to each other over a local area network (LAN) 300.

Each client PC 100 performs an imposition process (described later) including a process of making a top-to-bottom direction of a top cover and a top-to-bottom direction of a back cover the same as each other in accordance with a user's operation. Each client PC 100 corresponds to an example of an imposition device of the present invention, and a program concerning the imposition process (described later) that is executed in each client PC 100 corresponds to an example of an imposition program of the present invention. Hardware of each client PC 100 is a well-known common technology, and illustration and description thereof are omitted.

The multi-function printer 200 corresponds to an example of a printer of the present invention. The multi-function printer 200 has functions such as a communication function for establishing communication over the LAN 300, a scanner function for generating image data by reading an image on a document or the like, and a printing function for printing out an image onto a sheet of paper.

Figure 2A:
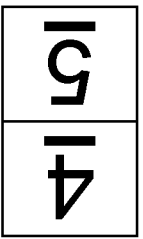
FIGS. 2A and 2B illustrate an example of arrangement of document pages.
Figure 2A:
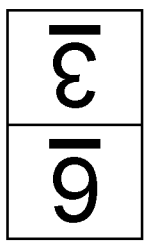
Figure 2A:
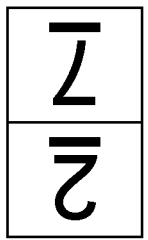
Figure 2A:
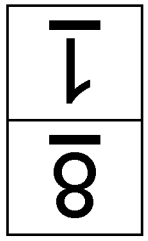
Figure 2B:
Figure 2B:
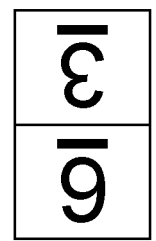
Figure 2B:
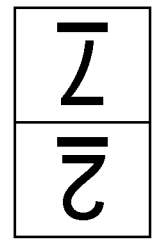
Figure 2B:
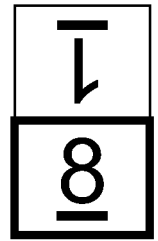

FIGS. 2A and 2B illustrate an example of arrangement of document pages. Specifically, FIGS. 2A and 2B illustrate arrangement of 8-page landscape documents (horizontally-long documents) that are to be bound on the left side (described later).

In this example, a sheet of paper after printing is folded into two parts along a center in a longitudinal direction of the sheet of paper. Accordingly, the 8-page documents are arranged on two sheets of paper so that two pages are located on each of front and back of each sheet of paper. As illustrated in FIGS. 2A and 2B, document page 8 and document page 1 are positioned on the front of the first sheet of paper. Document page 8 corresponds to the back of a printed material, and document page 1 corresponds to the front of the printed material.

In FIG. 2A, document page 8, which corresponds to the back of the printed material, is directed in the same direction as other document pages. Meanwhile, in FIG. 2B, only document page 8, which corresponds to the back of the printed material, is rotated by 180 degrees with respect to other document pages. After printing, these two sheets of paper are superimposed on each other, folded, and then bound together.

FIGS. 3A and 3B illustrate a printed material after binding.

In a case where all of the document pages are directed in the same direction as illustrated in FIG. 2A, a top cover and a back cover of an obtained printed material have top-to-bottom directions that are reverse to each other in a state where the printed material is closed as illustrated in FIG. 3A.

In view of this, a printed material on which only a page (document page 8 in this example) corresponding to a back cover is rotated by 180 degrees is created as illustrated in FIG. 2B. This allows a top cover and the back cover to have the same top-to-bottom direction as illustrated in FIG. 3B.

In a case where a user desires a printed material on which a top cover and a back cover have the same top-to-bottom direction like the one illustrated in FIG. 3B, conventionally, the user himself or herself determines a document page corresponding to the back cover and rotates this page by 180 degrees. However, if the user tries to rotate the page corresponding to the back cover by 180 degrees after pages are arranged, there is a risk of wrongly rotating a page different from the page corresponding to the back cover because the position of the page corresponding to the back cover differs depending on whether to select left binding or right binding or how to bind sheets of paper into separate parts (described later). Furthermore, in a case where the number of document pages is not a multiple of 4, the last document page does not necessarily correspond to the back cover because of the presence of a blank page. For this reason, if the user determines the page corresponding to the back cover on the basis of an image of the last document page, there is a risk of wrongly determining the page corresponding to the back cover. In view of this, in the present exemplary embodiment, a user just inputs his or her will about whether or not to rotate a back cover by 180 degrees, and a device automatically rotates a page corresponding to the back cover. This is described below in detail.

FIG. 4 illustrates a setting screen for setting a method for binding a booklet.

A user operates the client PC 100 to display the setting screen illustrated in FIG. 4 on a display screen of the client PC 100. In this example, "saddle stitching", "side stitching", or the like is selected in accordance with a user's operation. Methods other than "saddle stitching" and "side stitching" can be used to bind a booklet, but a method for binding a booklet is irrelevant to the description in the present exemplary embodiment, and description thereof is omitted. Arrangement of document pages in the case of "side stitching" is the same as that in a case where "saddle stitching" is selected and where "separation into parts each made up of a single sheet of paper" (described later) is selected. Therefore, the following description discusses a case where "saddle stitching" is selected.

FIG. 5 illustrates a detailed setting screen for setting a method for binding a booklet. Note that this detailed setting screen is one that collectively displays setting items necessary for the description in the present exemplary embodiment, and these setting items need not necessarily be displayed on a single menu screen and may be displayed on different menu screens. Furthermore, there are a large number of items other than those illustrated in FIG. 5, but these items are irrelevant to the following description, and illustration and description thereof are omitted.

On the detailed setting screen illustrated in FIG. 5, "binding direction", whether or not to select "separation into parts", "number of sheets of paper in each separate part" in a case where "separation into parts" is selected, "position at which blank page is inserted", and whether or not to "rotate back cover by 180 degrees" are set.

In this example, whether or not to rotate the last page is determined by using the setting screen for setting a method for binding a booklet and the setting screen for setting whether or not to "rotate back cover by 180 degrees". However, the rotation may be determined on the basis of a setting screen for setting whether or not a "calendar" is to be obtained (and on the basis of the setting screen for setting whether or not to "rotate back cover by 180 degrees"). Furthermore, the rotation may be determined on the basis of a setting screen for setting whether the "calendar" is a "wall calendar" or a "desk calendar". This is because a back cover is desirably rotated by 180 degrees in the former case, and it is sometimes unnecessary to rotate a back cover by 180 degrees in the latter case.

As for "binding direction", either "left binding" or "right binding" is selected.

Figure 6A:
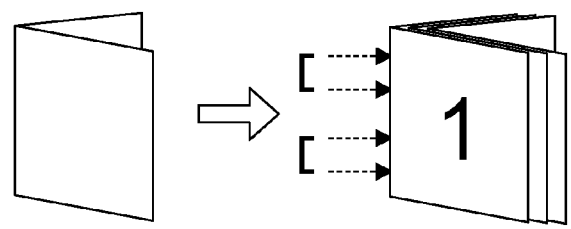
FIGS. 6A and 6B are schematic views illustrating the concept of "binding direction"
Figure 6B:
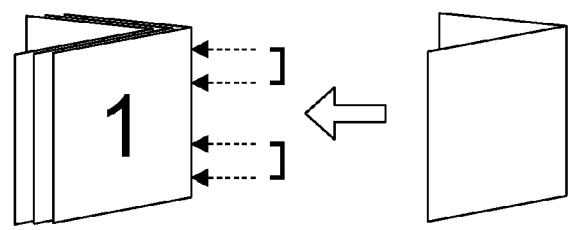

FIGS. 6A and 6B are schematic views illustrating the concept of "binding direction". FIGS. 6A and 6B illustrate "left binding" and "right binding", respectively.

The "left binding" illustrated in FIG. 6A is a binding method in which a portrait-oriented (vertically-long) printed material having a fold line on the left side when a top cover of the printed material in a correct posture faces a user is bound on the left side. The "right binding" illustrated in FIG. 6B is a binding method in which a portrait-oriented (vertically-long) printed material having a fold line on the right side when a top cover of the printed material in a correct posture faces a user is bound on the right side. The following discusses an example in which "left binding" is selected.

See FIG. 5 again.

On the detailed setting screen illustrated in FIG. 5, whether or not to select "separation into parts" and the "number of sheets of paper in each separate part" in a case where "separation into parts" is selected are set.

Figure 7A:
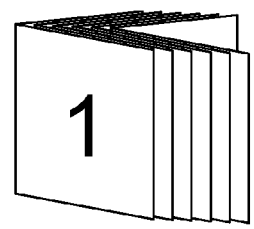
FIGS. 7A and 7B are schematic views illustrating the concept of "separate binding"
Figure 7B:
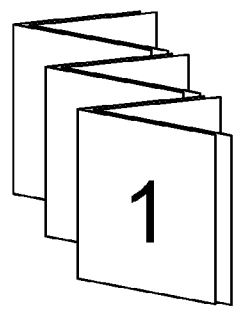

FIGS. 7A and 7B are schematic views illustrating the concept of "separation into parts".

FIG. 7A illustrates a case where "separation into parts" is not selected. In this case, sheets of paper on which all pages are printed are saddle-stitched together.

FIG. 7B illustrates a binding method used in a case where "separation into parts" is selected and the "number of sheets of paper in each separate part" is 2. The "number of sheets of paper in each separate part" refers to the number of sheets of paper that constitute each separate part. In FIG. 7B, the "number of sheets of paper in each separate part" is 2, i.e., three separate parts each made up of two sheets of paper are bound as a single booklet.

Figure 8A:
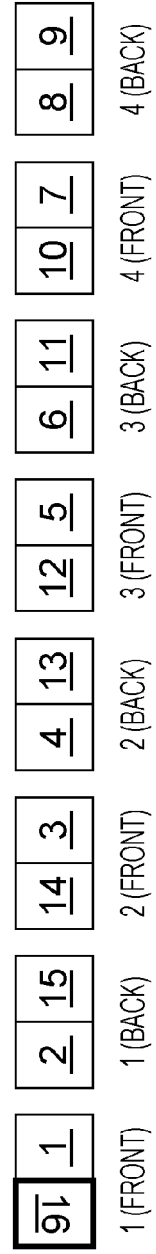
FIGS. 8A to 8C illustrate an example of arrangement of document pages.
Figure 8B:
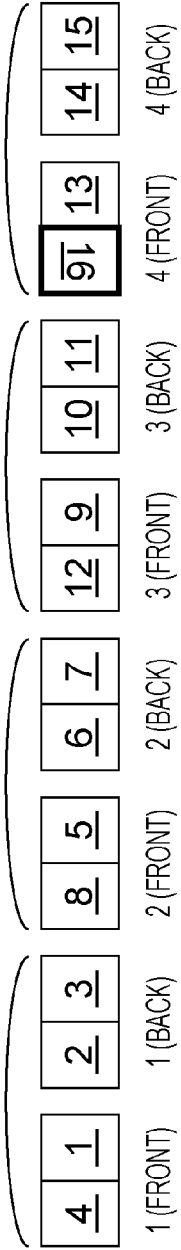
Figure 8C:
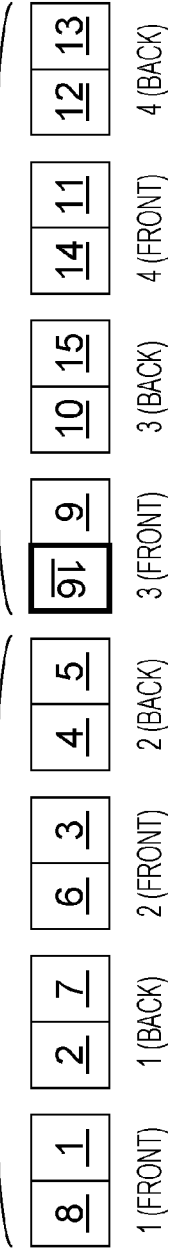

FIGS. 8A to 8C illustrate an example of arrangement of document pages. In FIGS. 8A to 8C, the position of document page 16 corresponding to a back cover is indicated by the bold frame, and document page 16 is rotated by 180 degrees.

FIG. 8A illustrates a way in which 16-page portrait-oriented (vertically-long) documents are arranged in a case where these documents are bound on the left side without separation into parts. In this case, page 16 corresponding to a back cover and page 1 corresponding to a top cover are located on the front of the first sheet of paper.

Note that although the positions of page 1 and page 16 in the lateral direction are the ones illustrated in FIG. 8A, reference to the positions in the lateral direction makes the description complicated and is therefore omitted. This also applies to description of the back of the first sheet of paper and the subsequent sheets of paper, and description of other drawings.

In a case where the documents are not bound into separate parts, as illustrated in FIG. 8A, pages (page 1 and page 16) that are located at both ends when the 16-page documents are arranged in a page order are positioned on the front of the first sheet of paper, page 2 and page 15, which are adjacent to both ends on the inner side, are positioned on the back of the first sheet of paper, and page 3 and page 14, which are adjacent to page 2 and page 15 on the inner side, are positioned on the front of the second sheet of paper. The other pages are positioned in a similar manner.

FIG. 8B illustrates a way in which 16-page portrait-oriented (vertically-long) documents are arranged in a case where these documents are bound on the left side and separated into "parts each made up of a single sheet of paper". In this case, page 1 corresponding to a top cover is positioned on the front of the first sheet of paper, but page 16 corresponding to a back cover is positioned on the front of the fourth sheet of paper.

In this case where the documents are separated into "parts each made up of a single sheet of paper" as illustrated in FIG. 8B, the 16-page documents arranged in a page order are divided into separately-bound sets each including four pages, and pages (page 1 and page 4) that are located at both ends among pages (page 1 to page 4) of the first separately-bound set are positioned on the front of the first sheet of paper, and remaining two pages (page 2 and page 3) are positioned on the back of the first sheet of paper. This also applies to other separately-bound sets.

FIG. 8C illustrates a way in which 16-page portrait-oriented (vertically-long) documents are arranged in a case where these documents are bound on the left side and separated into "parts each made up of two sheets of paper". In this case, document page 1 corresponding to a top cover is positioned on the front of the first sheet of paper, and document page 16 corresponding to a back cover is positioned on the front of the third sheet of paper.

In this case where the documents are separated into "parts each made up of two sheets of paper" as illustrated in FIG. 8C, the 16-page documents arranged in a page order are divided into separately-bound sets each including eight pages, and pages (page 1 and page 8) that are located at both ends among pages (page 1 to page 8) of the first separately-bound set are positioned on the front of the first sheet of paper, page 2 and page 7, which are adjacent to both ends on the inner side, are positioned on the back of the first sheet of paper, and page 3 and page 6, which are adjacent to page 2 and page 7 on the inner side, are positioned on the front of the second sheet of paper, and remaining two pages (page 4 and page 5) are positioned on the back of the second sheet of paper. This also applies to the other separately-bound set.

As illustrated in FIGS. 8A to 8C, the position of a back cover, which is rotated by 180 degrees in some cases, changes depending on whether or not to select separation into parts and the number of sheets of paper in each separate part.

See FIG. 5 again.

On the detailed setting screen illustrated in FIG. 5, the "position at which blank page is inserted" is set. Setting of the "position at which blank page is inserted" is effective in a case where the number of document pages is not a multiple of 4. In this example, any of "last page", "second last page", "second page", and "first page" is selected as the "position at which blank page is inserted".

In a case where the number of document pages is not a multiple of 4, a blank page is generated. In this case, by determining the "position at which blank page is inserted", at which position this blank page is inserted in the array of document pages is selected.

For example, in a case where "last page" is selected, the last page becomes a blank page. In a case where plural blank pages are generated and where "last page" is selected, plural pages including the last page and pages preceding the last page become blank pages. This also applies to "second last page", "second page", and "first page".

FIGS. 9A to 9D are schematic views illustrating a position at which a blank page is inserted. Specifically, FIGS. 9A to 9D illustrate positions at which blank pages are inserted in a case where 14-page landscape-oriented (horizontally-long) documents are bound on the left side without separation into parts.

Figure 9A:
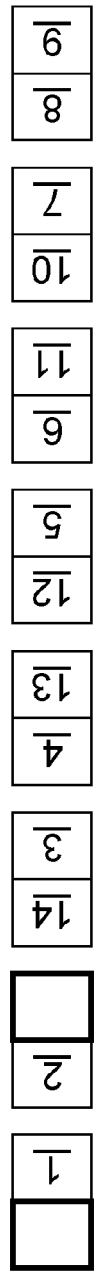
FIGS. 9A to 9D are schematic views illustrating a position at which a blank page is inserted.

FIG. 9A illustrates a way in which document pages including blank pages are arranged in a case where "last page" is selected as the "position at which blank page is inserted".

As described above, FIGS. 9A to 9D illustrate a case where the number of document pages is 14.

In FIG. 9A, pages corresponding to the last page (page 16) and the second last page (page 15) in FIG. 8A, in which the number of document pages is 16 (a multiple of 4) and the document pages are not separated into parts, are blank pages. That is, in this case, a blank page is a back cover.

Figure 9B:
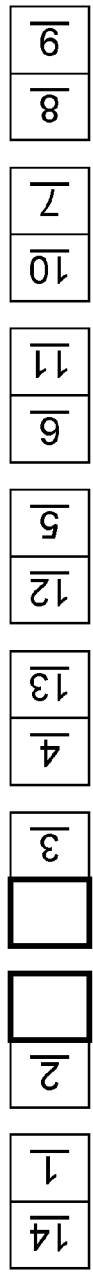

FIG. 9B illustrates a way in which document pages including blank pages are arranged in a case where "second last page" is selected as the "position at which blank page is inserted".

In FIG. 9B, page 14, which is the last document page, is positioned on a back cover (the front of the first sheet of paper), and pages corresponding to the second last page (document page 15) and the third last page (document page 14) in FIG. 8A, in which the number of document pages is 16, are blank pages.

Figure 9C:
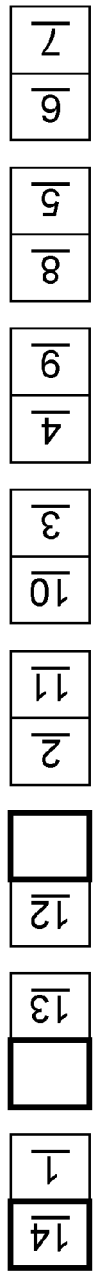

FIG. 9C illustrates a way in which document pages including blank pages are arranged in a case where "second page" is selected as the "position at which blank page is inserted".

In this case, pages corresponding to document page 2 and next document page 3 in FIG. 8A, in which the number of document pages is 16, are blank pages.

Figure 9D:
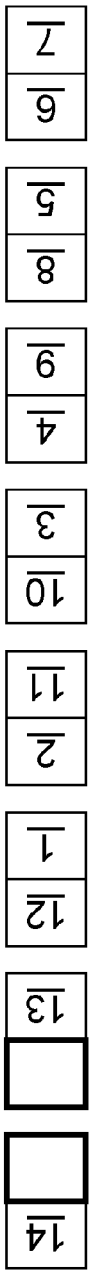

FIG. 9D illustrates a way in which document pages including blank pages are arranged in a case where "first page" is selected as the "position at which blank page is inserted".

In this case, pages corresponding to the first document page (page 1) and next document page 2 in FIG. 8A, in which the number of document pages is 16, are blank pages.

In FIG. 9A, a blank page is a back cover. In FIGS. 9B to 9D, document page 14 is a back cover. Therefore, in a case where a user determines a page to be rotated by 180 degrees and if the user wrongly rotates the last document page (page 14), a page that is not a back cover is reversed in FIG. 9A. FIGS. 9A to 9D illustrate cases where the documents are not separated into parts, but a similar problem can occur in a case where the documents are separated into parts. In the present exemplary embodiment, a device automatically performs a process for determining a page corresponding to a back cover and a process for rotating this page, while a user just expresses his or her will concerning whether or not to rotate the back cover by 180 degrees without determining which page corresponds to the back cover. In this way, rotation of a wrong page is prevented.

See FIG. 5 again.

On the detailed setting screen illustrated in FIG. 5, whether or not to "rotate back cover by 180 degrees" is set.

Depending on this setting, the back cover is rotated by 180 degrees or is not rotated.

Figure 10:
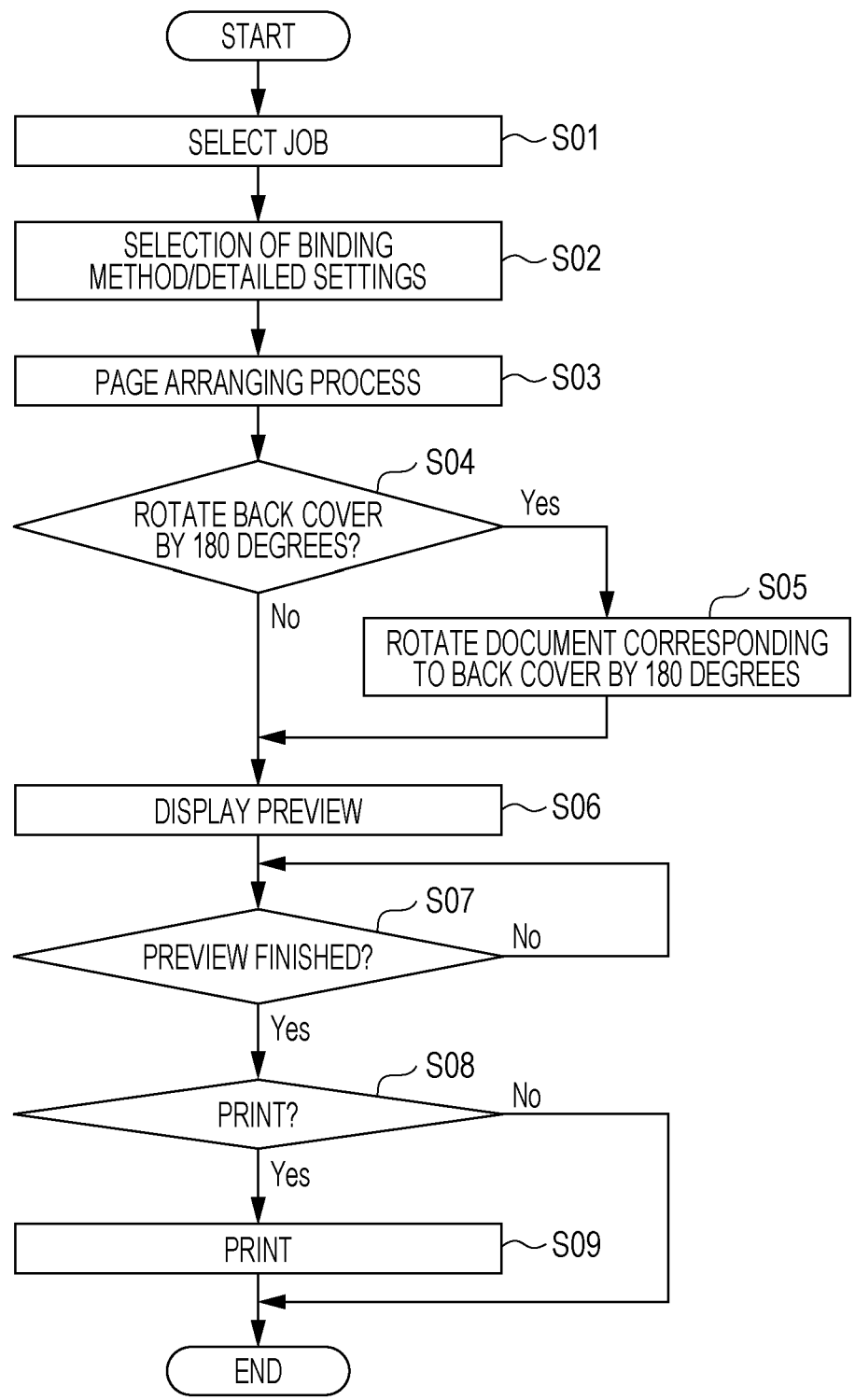
FIG. 10 is a flowchart of an imposition program.

FIG. 10 is a flowchart of an imposition program.

The imposition program illustrated in FIG. 10 is executed in the client PC 100 illustrated in FIG. 1, and thus the imposition process illustrated above is performed.

A job (a set of documents) is selected in accordance with a user's operation (Step S01). Next, a binding method is set (see FIG. 4), and detailed settings are determined (see FIG. 5) (Step S02). Then, a page arranging process is performed in the client PC 100 (Step S03). This page arranging process in Step S03 will be described later with reference to FIG. 11.

Next, it is determined whether or not an instruction to rotate a back cover by 180 degrees is given (see FIG. 5) (Step S04). In a case where an instruction to rotate the back cover by 180 degrees is given, a page corresponding to the back cover is rotated by 180 degrees (Step S05). Then, a preview of a printed image is displayed on which the pages are arranged in accordance with the page arranging process (Step S03) and the back cover has been rotated in accordance with an instruction to rotate the back cover in a case where the instruction is given (Step S06). When an instruction to finish the preview is given (Step S07) and an instruction to print the pages is given (Step S08), the printed image and a printing instruction based on the printed image are transmitted from the client PC to the multi-function printer 200 (Step S09). Upon receipt of this instruction, the multi-function printer 200 prints the printed image on sheets of paper.

Figure 11:
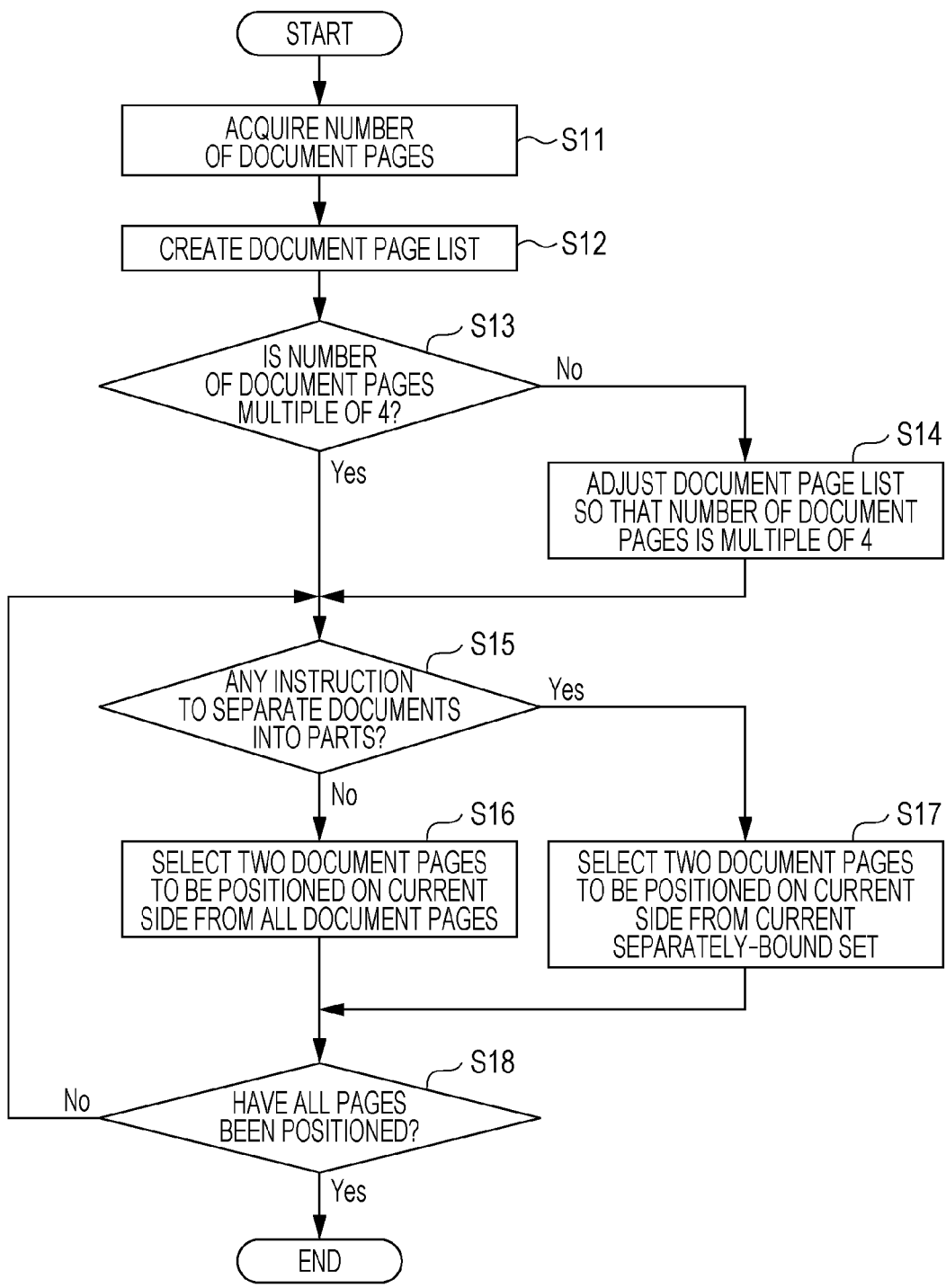
FIG. 11 is a flowchart of a page arranging process.

FIG. 11 is a flowchart of the page arranging process. The page arranging process illustrated in FIG. 11 is the process in Step S03 of FIG. 10.

First, the number of document pages is acquired (Step S11), and then a document page list is created (Step S12). The "document page list" is an array of frames in each of which a single document page is positioned.

Next, it is determined whether or not the number of document pages is a multiple of 4 (Step S13). In a case where the number of document pages is not a multiple of 4, a frame in which a blank page is positioned is added to the document page list (Step S14).

Next, the following processes are repeated for each side. The "side" as used herein refers to the front or back of a sheet of paper. That is, two document pages (including a blank page) are positioned on each side.

In the present exemplary embodiment, it is determined whether or not an instruction to separate the documents into parts is given (see FIG. 5) (Step S15). In a case where an instruction to separate the documents into parts is not given, two document pages to be positioned on a side that is currently processed are selected from among all of the document pages (Step S16). In a case where there is a blank page, the blank page is inserted in accordance with setting of the "position at which blank page is inserted" illustrated in FIG. 5 (see FIG. 9).

Meanwhile, in a case where it is determined in Step S15 that an instruction to separate the documents into parts is given, the process proceeds to Step S17, in which two document pages to be positioned on a side that is currently processed are selected from a current separately-bound set (a set of document pages) (Step S17). In a case where the documents are separated into "parts each made up of a single sheet of paper" as illustrated in FIG. 8B, each separately-bound set is made up of four document pages. In a case where the documents are separated into "parts each made up of two sheets of paper" as illustrated in FIG. 8C, each separately-bound set is made up of eight document pages. This also applies to other cases such as a case where the documents are separated into "parts each made up of three sheets of paper". In Step S17, in a case where there is a blank page, the blank page is inserted in accordance with setting of the "position at which blank page is inserted" illustrated in FIG. 5 (see FIG. 9).

The page arranging process is repeated for each side (Step S18), and when all of the pages including the blank page have been positioned, the page arranging process illustrated in FIG. 11 is finished. Then, the processes in Step S04 and the subsequent steps of FIG. 10 are performed.

As a result of the above processes, a user need just set whether or not to rotate the back cover by 180 degrees (see FIG. 5), and the back cover is automatically rotated or is not rotated in accordance with the setting. In this way, an incorrect operation of rotating a wrong page is prevented. Furthermore, the user is saved from performing the rotating process.

Note that the process for rotating a back cover by 180 degrees is a process for calendars and utilizes imposition for booklets, but, in the case of calendars, documents need not necessarily be bound as a booklet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An imposition device comprising:
    an imposing unit that imposes an order on the arrangement of images of a plurality of document pages for a pamphlet composed of sheets on which the images are arranged and printed, one of the images comprising a back cover image to be printed on at least a portion of one of the sheets comprising a back cover page of the pamphlet when the sheets are assembled into the pamphlet;
    a rotation selecting unit that selects a first option to rotate, by 180 degrees, the back cover image without selecting the page or sheet of the pamphlet on which the back cover image will be printed or a second option not to rotate the back cover image;
    a rotation processing unit that, in response to the rotation selecting unit selecting the first option, automatically determines the sheet of the pamphlet on which the back cover image is to be printed, and rotates the back cover image to be printed on the automatically determined sheet; and a printer that prints the images of the plurality of document pages on the sheets in the order arranged by the imposing unit, including printing the rotated back cover image on the sheet automatically determined by the rotation processing unit in response to the selection of the first option by the rotation selecting unit.

2. The imposition device according to claim 1, wherein
the imposing unit imposes the images of the document pages on basis of a print setting;
the print setting includes a setting as to whether or not a calendar is to be obtained; and
the rotation selecting unit rotates the image that corresponds to the back cover by 180 degrees in a case where the print setting indicates that the calendar is to be obtained.

3. The imposition device according to claim 2, wherein
the setting as to whether or not the calendar is to be obtained includes a setting as to whether the calendar is a wall calendar or a desk calendar; and
the rotation selecting unit rotates the image that corresponds to the back cover by 180 degrees in a case where the print setting indicates that the calendar is the wall calendar.

4. The imposition device according to claim 1, wherein
the imposing unit imposes the images of the document pages on basis of a print setting;
the print setting includes a setting as to whether or not a booklet is to be obtained and setting whether or not to rotate a last page; and
the rotation selecting unit rotates the image that corresponds to the back cover by 180 degrees in a case where the print setting indicates that the booklet is to be obtained and that the last page is rotated.

5. A non-transitory computer readable medium storing a program causing a computer to execute a process for imposition comprising:

imposing an order on the arrangement of images of a plurality of document pages for a pamphlet composed of sheets on which the images are arranged and printed, one of the images comprising a back cover image to be printed on at least a portion of one of the sheets comprising a back cover page of the pamphlet when the sheets are assembled into the pamphlet;

selecting a first option to rotate, by 180 degrees, the back cover image without selecting the page or sheet of the pamphlet on which the back cover image will be printed or a second option not to rotate the back cover image;

automatically determining the sheet of the pamphlet on which the back cover image is to be printed, in response to selecting the first option;

rotating the back cover image to be printed on the automatically determined sheet; and printing the images of the plurality of document pages on the sheets in the order arranged by the imposing step, including printing the rotated back cover image on the sheet automatically determined by the automatic determining step in response to selecting the first option.

6. An imposition method comprising:

imposing an order on the arrangement of images of a plurality of document pages for a pamphlet composed of sheets on which the images are arranged and printed, one of the images comprising a back cover image to be printed on at least a portion of one of the sheets comprising a back cover page of the pamphlet when the sheets are assembled into the pamphlet;

selecting a first option to rotate, by 180 degrees, the back cover image without selecting the page or sheet of the pamphlet on which the back cover image will be printed or a second option not to rotate the back cover image;

automatically determining the sheet of the pamphlet on which the back cover image is to be printed, in response to selecting the first option;

rotating the back cover image to be printed on the automatically determined sheet; and printing the images of the plurality of document pages on the sheets in the order arranged by the imposing step, including printing the rotated back cover image on the sheet automatically determined by the automatic determining step in response to selecting the first option.

* * * * *